United States Patent [19]

Harshbarger

[11] Patent Number: 4,533,950
[45] Date of Patent: Aug. 6, 1985

[54] METHOD OF TESTING THE LINEARITY OF A RASTER SCAN

[75] Inventor: John H. Harshbarger, Xenia, Ohio

[73] Assignee: Visual Information Institute, Inc., Xenia, Ohio

[21] Appl. No.: 478,157

[22] Filed: Mar. 23, 1983

[51] Int. Cl.³ .............................................. H04N 7/02
[52] U.S. Cl. ..................................................... 358/139
[58] Field of Search ..................... 358/139, 10; 382/30, 382/48

[56] References Cited

U.S. PATENT DOCUMENTS

| | | | |
|---|---|---|---|
| 2,648,724 | 8/1953 | Enslein | 358/139 |
| 2,648,764 | 8/1953 | Enslein | 358/139 |
| 3,181,077 | 4/1965 | Pourciau | 358/139 |
| 3,612,760 | 10/1971 | McKechnle | 358/139 |
| 4,093,960 | 6/1978 | Estes | 358/139 |
| 4,106,846 | 8/1978 | Russin | 358/10 |

OTHER PUBLICATIONS

Visual Information Institute Precision Linearity Chart, 1980.
VII Signal Source 1206 Brochure, 1980.

*Primary Examiner*—Howard W. Britton
*Assistant Examiner*—Victor R. Kostak
*Attorney, Agent, or Firm*—Albert L. Jeffers; John F. Hoffman

[57] ABSTRACT

The method for testing the linearity and other raster scan geometry of a television display apparatus or a television camera. The method is used when the display apparatus or camera being tested has a scan rate which cannot match the currently used EIA linearity chart due to fundamental differences in the raster structure and can also be used on the 525/60 scan rate as used in broadcast mode without requiring the unusual alternate count required for the EIA chart. In testing a display apparatus, a bar or dot pattern is formed on the screen by a test pattern generator wherein the spacing of the horizontal rows of dots or bars is selected to correspond to a particular scan rate. A linearity chart having a geometry corresponding to that scan rate is selected from a plurality of test charts and the image thereof is projected on the screen to match, as closely as possible, the dots or bar intersections on the screen. The amount of non-linearity can be quantified by noting the positions of the dots or bar intersections relative to the concentric annuli of each graphic element making up the chart. The television camera can be tested in a similar fashion by viewing the selected linearity chart and superimposing the image produced by the camera with the dot or bar pattern of the selected scan rate produced by the test pattern generator.

25 Claims, 10 Drawing Figures

METHOD OF TESTING THE LINEARITY OF A RASTER SCAN

BACKGROUND OF THE INVENTION

The present invention relates to a method for testing the raster scan geometry, such as the linearity of the scan, of a television display apparatus, such as a television monitor, or a television camera.

Modern applications of television display apparatus, such as closed circuit television monitors, demand much greater accuracy in the raster scan geometry, particularly in non-broadcast applications. For example, computer generated images on the screens of cathode ray tube devices are developed with very great timing accuracy, and systems are currently being offered in which the analysis of data can be made by taking measurements directly off the image displayed on the screen. For example, in computerized medical X-ray technology, it is desirable to make measurements of tumor size directly off the television display, so size and accuracy of the displayed image are of paramount importance. Scan size may be specified to within a few thousandths of an inch, and stability over the short and long term must assure that size and position will remain within a few thousandths of an inch through cold start, continuous operation, and varying ambient temperatures. In order to be able to test the more precise television devices that have been developed recently, new test procedures and apparatus that can conform to such precision have become necessary.

The generally accepted method of measuring linearity of a cathode ray tube display apparatus or television camera is the comparison of an electronically generated reference grid compared to a test chart, wherein the chart is either projected on the screen or viewed by a camera and the electronically generated images produced on the screen. The chart that has been in use for many years is the EIA linearity chart, which is sometimes referred to in the industry as the "Ball" chart. The chart comprises a plurality of rows and columns of black circles on a white background wherein the center of each circle is also white. The chart is standard in format and is matched to a 525 line raster having a scan rate of 525/60. Linearity charts for other scan rates not compatible with a 525/60 scan rate chart have not been developed.

In testing a television camera, the camera is arranged to view the linearity chart, and the image of the chart is then produced on the television monitor connected to the camera. An electronically generated pattern, such as a bar pattern or dot pattern, is superimposed on the camera output signal and the combination signal is displayed on the television monitor for analysis. The camera is manipulated so that the image of the chart is matched as closely as possible to the electronically generated bar or dot pattern, that is, as many as possible of the dots or intersections of the vertical and horizontal bars are caused to coincide with the centers of the circles of the graphic elements making up the linearity chart. The amount of non-linearity can be measured by noting the positions of the dots or bar intersections relative to the graphic elements, in the case of the linearity chart individual circles surrounding a center space.

In measuring the linearity of a display device, such as a television monitor, the linearity chart would be projected onto the screen of the monitor by a slide projector, although the chart could be directly "projected" by using a transparent overlay affixed to the face of the screen. The electronically generated dot or bar pattern produced by a television test pattern generator would be produced on the screen, and by the monitor adjusted so that as many as possible of the dots or bar intersections would fall within the centers of the projected chart circles. The electronically generated pattern, if accurately produced, will match the chart when the scan is linear and without other distortions, and a perfectly linear scan is indicated if each electronically generated dot or bar intersection falls within the exact center of the chart circles.

A fundamental problem with the current testing procedure is that the traditional linearity chart is configured to match the bar or dot pattern from a traditional broadcast studio synchronizing generator, which produces an average horizontal bar spacing of 17.5 lines in the 525 line raster. In the standard pattern used with the linearity chart, the vertical bars are made up of 20 elements per total horizontal line, including blanking which is 17.5% of the total line. Thus, there are 17 visible vertical bars centered in the active area, and the bars at the left and right are set in from the edge of the display by 1.25% of the total horizontal line time. The pattern comprises 15 equally spaced horizontal bars, one of which is invisible due to the 7.5% vertical blanking interval. This results in 14 horizontal bars being visible with the bars at the top and bottom of the raster being set in from the respective edges by 2.85% of the total vertical field time.

Although the dot or bar pattern described above is compatible with the standard linearity chart, many scan rates are in common use, most of which cannot match the standard linearity chart due to the fundamental raster structure. Calibration of the horizontal bars in the vertical plane of the pattern based on 15 elements spaced equally in the total vertical television field, including blanking time, can be easily accomplished because the total number of horizontal lines (525) is equally divisible by the 15 horizontal bar elements. The vertical field is produced at 60 hertz for all scan rates described by present U.S. standards; therefore, the repetition rate for horizontal bar elements is 900 hertz, requiring 1,111 microseconds between the elements. It is necessary, in an accurately generated pattern, for the horizontal bar element to occur for one complete scan line, positively locked so as to preclude drift or "run through" that will permit intensification of partial lines. Otherwise, an error of at least one scan line width can occur in the display of the pattern.

These factors present a conflict because 1,111 microseconds is not an even multiple of the scanning line for any of the standard scan rates. The 525/60, 675/60 and 945/60 scan rates can be accommodated by an alternating count technique, but for other rates, a precise and straightforward measurement is possible only by the use of linearity charts that are modified or customized to match the raster structure of each rate.

Certain scan rates whose number of scan lines in two fields (one frame) is divisible by 15 are usable with the standard linearity chart by using a horizontal alternate count. For example, a scan rate of 675/60 comprises 675 horizontal lines and is divisible by 15, the number of horizontal bars or rows of dots to be produced according to generally accepted standards. For other, non-equally divisible, scan rates, the standard linearity chart has been used but it was necessary to vary the chart-pattern matching procedure in order to artificially constrain the pattern or size of the chart to match. For example, the chart projected image could be reduced in horizontal height in order to match up with the geometric centers of the horizontal rows of dots or horizontal bars, but this would also result in a narrowing of the vertical bars, and it would then be necessary to modify the controls of the monitor to narrow the vertical bar spacing. Furthermore, a reduction in the size of the projected image of the chart results in a reduction in the size of the circles, so that the radii of the circles no longer accurately represent a percentage of the height of the display, which is the basis for quantitative evaluation. Electronically changing the location of the vertical bars or vertical columns of dots in the generated pattern results in a distortion of the pattern and automatically throws an error into the image displayed on the screen. In other words, the pattern displayed by the television monitor is not displayed under normal operating conditions, but the controls of the monitor are manipulated to artificially adjust the positions of the vertical columns. When the test procedure is completed and the monitor is readjusted to its normal operating setting, then there is no assurance that the same degree of linearity is present after the test as during the test because the control parameters are not the same. This reduces the precision of the linearity test procedure and one can never be certain of the quantitative amount of non-linearity under normal operating conditions.

SUMMARY OF THE INVENTION

The method according to the present invention overcomes the disadvantages and inaccuracies present in the prior art testing methods described above by providing a plurality of test charts that are matched to bar or dot patterns of a respective plurality of scan rates electronically produced on the screen of the monitor. The horizontal rows and vertical columns of the reference images, whether dots or intersections of vertical and horizontal bars, are positioned on the raster through the selection of the electronic signal produced by a test pattern generator and connected to the input of the television monitor. Thus, the monitor has its controls set for normal operation, and variation in the spacing of the horizontal rows of reference images is accomplished solely by manipulation of the test pattern generator. The projected image of the linearity chart or the representation of the linearity chart produced on the screen by a television camera will fill the entire viewing area of the screen and the centers of the graphic elements of the chart will coincide exactly with the dots or bar intersections of a display that is "perfectly" linear.

If the scan rate is changed, then the electronic signal fed to the television monitor is changed accordingly so that the horizontal positions of the reference images are changed, and a linearity chart having the centers of its graphic elements located at the ideal locations of the reference images is selected. Thus, the test method enables accurate testing of a display device or a camera regardless of scan rate without the necessity for monitoring the controls of the display apparatus or camera to distort the image in order to provide a fit between the pattern and the chart.

In the method of the present invention, there is provided to the television display apparatus an electrical signal corresponding to a selected scan rate and generated by means of an electronic test pattern generator so as to produce on the raster scan of the television display apparatus a plurality of reference images arranged in a plurality of orthogonal horizontal rows and vertical columns, wherein the spacing of the horizontal rows is adjusted by selecting a particular scan rate from a plurality of available scan rates for the electrical signal provided to the display apparatus. The reference images may be dots, the intersection points of vertical and horizontal bars, or other reference points on the screen, and the method is not limited to a particular number of horizontal and vertical rows and columns, but could be adapted to other pattern formats.

A plurality of test chart transparencies are provided, wherein the transparencies are matched to a plurality of the scan rates, each transparency comprising a plurality of horizontal rows and vertical columns of substantially identical graphic elements on a background, each element comprising at least two concentric annuli surrounding a circular center space. In the specific embodiment disclosed, the graphic elements comprise concentric black circles separated by a band of white and wherein the center portion of the element is a white circle. A transparency is selected from the plurality of transparencies that matches the scan rate of the signal provided to the display apparatus, and an image of the transparency is projected on the screen of the display such that as many of the reference images as possible are located at the centers of the respective graphic elements. The image can be "projected" by projecting a slide transparency from a slide projector, for example, or by placing a transparency directly on the screen. The linearity of the scan geometry can be determined by noting the number of reference images which lie within the respective graphic elements and the positions of the reference images which lie within the graphic elements relative to the respective concentric annuli and center spaces.

The application also relates to a method of testing the geometry of the raster scan of a signal produced by a television camera comprising connecting a television monitor to the camera for displaying the scene viewed by the camera, and providing to the monitor an electrical signal corresponding to a selected scan rate and generated by means of an electronic test pattern generator which produces on the raster a plurality of reference images arranged in a plurality of orthogonal horizontal rows and vertical columns and adjusting the spacing of the horizontal rows by selecting a particular scan rate from a plurality of available scan rates for the electrical signal provided to the monitor. A plurality of linearity test charts are provided wherein the charts are matched to a plurality of respective scan rates, each chart comprising a plurality of horizontal rows and vertical columns of substantially identical graphic elements on a background wherein each element comprises at least two concentric annuli surrounding a circular center space. A chart matching the scan rate of the signal is selected from the plurality of charts and is viewed by the camera to cause the chart to appear on the screen of the monitor such that as many other reference images as possible are located at the centers of the respective graphic elements on the screen, whereby the linearity of the scan geometry can be determined by noting the number of reference images which lie within the respective graphic elements and the positions of the reference images relative to respective concentric annuli and center spaces.

It is an object of the present invention to provide a method for testing geometry the of a raster scan for a television display apparatus or television camera wherein the controls of the camera and display apparatus are set to their normal settings, and it is not necessary to distort the test pattern displayed on the screen in order to cause it to fit the test chart image.

It is a further object of the present invention to provide a method for testing the linearity of scan geometry wherein the images of the chart graphic elements can be projected or displayed on the screen without reduction and the size of the individual graphic elements as a predetermined percentage of the overall display can be maintained.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

DETAILED DESCRIPTION

Figure 6:
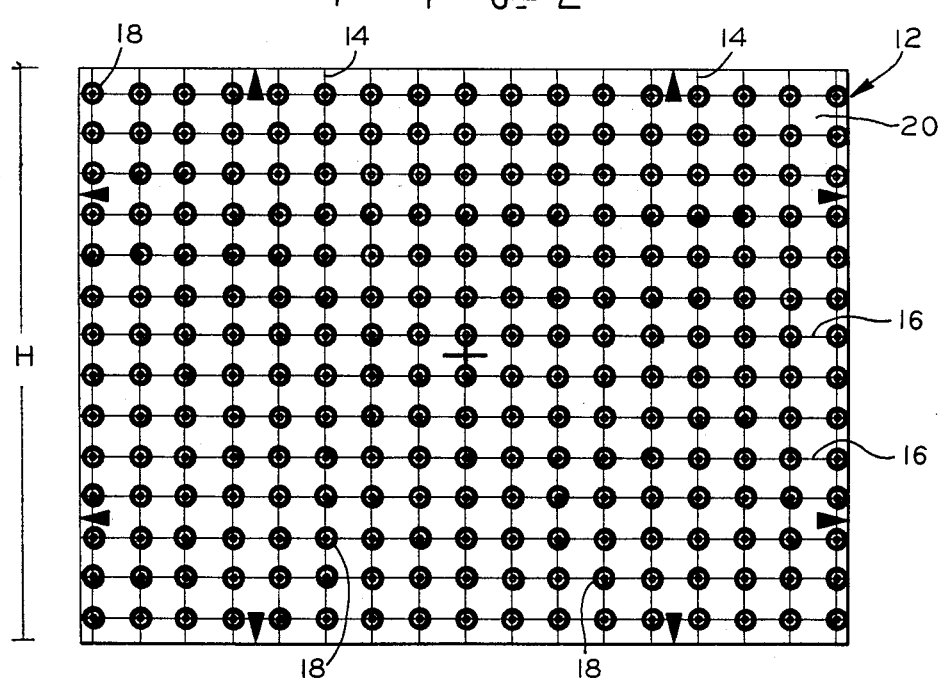
FIG. 6 is a view of a 525/60 scan rate linearity chart having a 4×3 aspect ratio on which is superimposed a bar pattern.

FIG. 6 illustrates a linearity chart 12 for a 525/60 scan rate as it would appear if it were projected or displayed on a television screen and superimposed with a bar pattern comprising a plurality of vertical bars 14 and a plurality of horizontal bars 16 perpendicular to vertical bars 14. The linearity chart 12 comprises a plurality of substantially identical graphic elements 18, which are shown in detail in FIG. 7. Graphic elements 18 are arranged in horizontal rows and vertical columns that are orthogonal to each other, and in the case where the scan geometry is perfectly linear, the geometric centers of the graphic elements 18 would coincide with the intersections of vertical bars 14 and horizontal bars 16.

Figure 7:
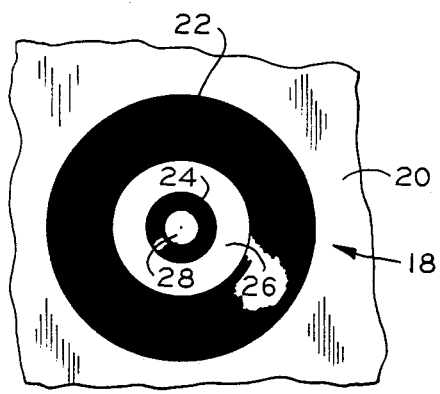
FIG. 7 is an enlarged view of one of the graphic elements of the linearity chart of FIG. 6.

Referring now to FIG. 7, graphic elements 18 are printed or otherwise affixed to a white background 20, in the case where chart 12 is a cardboard chart. In a case where the chart 12 is a transparency or overlay, background 20 would be completely transparent, and if chart 12 were viewed by a television camera and then displayed on a monitor, the background 20 would typically be light gray. The exact color or shading of background 20 and graphic elements 18 is not important, however, as long as there is a sufficient level of contrast.

Graphic element 18 comprises a black outer annulus 22, an black inner annulus 24 separated by an annulus 26 of the same shade as background 20, and wherein the center area 28 surrounded by the inner annulus 24 is also the same shade as background 20. The radius of center area 28 is $\frac{1}{4}$% of the total height H of the chart (FIG. 6), the radius of the outer periphery of inner annulus 24 is $\frac{1}{2}$% of the display height H, the radius of the periphery of annulus is 1% of the height H of the display, and the radius of the outer periphery of annulus 22 is 2% of the total height H. Thus, the location of a point within one of the areas 22, 24, 26 or 28 of a graphic element 18 indicates an error of plus or minus $\frac{1}{4}$%, $\frac{1}{2}$%, 1% or 2% of the overall display and within an accuracy corresponding to the respective aforesaid percentages. Because the aspect ratio of the chart 12 is known, in this case 4×3, the percentage of error in the horizontal direction with respect to the vertical columns can also be quantified.

As shown, chart 12 comprises 17 columns and 14 rows of graphic elements 18. Although the spacing and positions of the horizontal rows of elements 18 will change with the scan rate, the 17 vertical columns are positioned the same for all rates and the dimensions of graphic elements 18 discussed above are the same for all rates. The method according to the present invention is not limited to a pattern or chart having 17 columns and 14 rows, however, but could be applied to any configuration.

The spacing between the horizontal rows of graphic elements 18, as measured from their respective geometric centers, vary depending upon the scan rate in question. For example, for a scan rate of 525/60, which means that there are 525 horizontal lines in a complete frame (two fields in 2:1 interlace) including vertical blanking, the distance between adjacent horizontal rows measured from the geometric centers of the graphic elements is 7.01% of the total display height. In other words, the top edge of the display is considered 0.0%, the bottom edge is 100.0%, the first horizontal row is 4.5% down from the top edge, the second row is 7.01% down from the first row, the third row is 7.01% down from the second row, and so forth. For a 945/60 scan rate, the horizontal row spacing is 7.10% with the top row 3.9% below the top edge, the second row 7.10% below the first row, and so forth.

The vertical columns are always positioned with the same spacing regardless of scan rate. With the left edge of the display at 0.0% of the full width and the right edge at 100% thereof, the left most column of graphic elements 18 will be located 1.5% in from the left edge, the second column 7.6% from the left edge, the third column 13.6% from the left edge, and so forth, with a vertical column spacing of 5.8% of the display width.

The following chart illustrates the positions of the geometric centers of graphic elements 18 on chart 12 expressed as percentages of the chart height or chart width.

| LINEARITY CHART STRUCTURE TO MATCH T.V. RASTER STRUCTURE 4 × 3 ASPECT RATIO | | | | | | | | |
|---|---|---|---|---|---|---|---|---|
| V COLUMN CENTERLINE AS % OF CHART WIDTH ALL SCAN RATES | | SCAN RATE | H ROW CENTERLINE AS % OF CHART HEIGHT | | | | | |
| | | | 525/60 | 875/60 | 945/60 | 1023/60 | 1029/60 | 1225/60 | 625/60 |
| LEFT EDGE | 0 | TOP EDGE | 0 | 0 | 0 | 0 | 0 | 0 | 0 |
| COL. 1 | 1.5 | ROW NO. 1 | 4.5 | 3.5 | 3.9 | 3.2 | 3.6 | 3.0 | 3.4 |
| 2 | 7.6 | 2 | 11.5 | 10.6 | 11.0 | 10.4 | 10.7 | 10.2 | 10.6 |
| 3 | 13.6 | 3 | 18.6 | 17.8 | 18.1 | 17.6 | 17.9 | 17.5 | 17.8 |
| 4 | 19.7 | 4 | 25.6 | 25.0 | 25.2 | 24.8 | 25.0 | 24.7 | 25.0 |
| 5 | 25.8 | 5 | 32.6 | 32.1 | 32.3 | 32.0 | 32.2 | 32.0 | 32.1 |
| 6 | 31.8 | 6 | 39.6 | 39.3 | 39.4 | 39.2 | 39.3 | 39.2 | 39.3 |
| 7 | 37.9 | 7 | 46.6 | 46.5 | 46.5 | 46.3 | 46.5 | 46.4 | 46.5 |
| 8 | 41.9 | 8 | 53.6 | 53.6 | 53.6 | 53.5 | 53.6 | 53.7 | 53.7 |
| 9 | 50.0 | 9 | 60.6 | 60.8 | 60.7 | 60.7 | 60.8 | 60.9 | 60.9 |
| 10 | 56.1 | 10 | 67.6 | 68.0 | 67.8 | 67.9 | 67.9 | 68.1 | 68.0 |
| 11 | 62.1 | 11 | 74.6 | 75.2 | 74.9 | 75.1 | 75.1 | 75.4 | 75.2 |
| 12 | 68.2 | 12 | 81.6 | 82.3 | 82.0 | 82.3 | 82.2 | 82.6 | 82.4 |
| 13 | 74.2 | 13 | 88.7 | 89.4 | 89.1 | 89.5 | 89.4 | 89.5 | 89.6 |
| 14 | 80.3 | 14 | 95.7 | 96.7 | 96.2 | 96.7 | 96.5 | 97.1 | 96.8 |
| 15 | 86.4 | BOTTOM EDGE | 100.0 | 100.0 | 100.0 | 100.0 | 100.0 | 100.0 | 100.0 |
| 16 | 92.4 | ROW SPACING | 7.01 | 7.16 | 7.10 | 7.20 | 7.15 | 7.24 | 7.17 |
| 17 | 98.5 | | | | | | | | |
| RT EDGE | 100.0 | | | | | | | | |
| V COLUMN SPACING IS 5.8% OF CHART WIDTH | | | | | | | | | |

Figure 1:
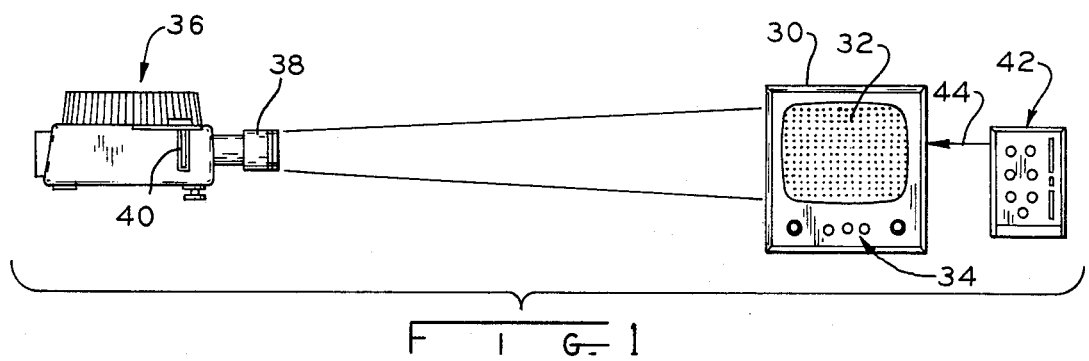
FIG. 1 is a diagrammatic representation of a test for the linearity of a television monitor.

FIG. 1 illustrates the equipment setup necessary to test the linearity of a conventional television display monitor 30 having a cathode ray tube screen 32 and controls 34. A slide projector 36 including lens 38 projects on screen 32 the image of slide transparency 40 that has imprinted thereon the linearity chart 12 for the particular scan rate that is being used. Lens 38 is a variable focal length lens having a focal length of 4"–9.6", such as lens catalog No. 138-060 manufactured by Buhl of Pittsburgh, Pa. The image of slide transparency 40 is projected on screen 32 such that it completely fills the area of the raster thereby resulting in a condition where the various dimensions of the graphic elements 18 (FIG. 7) correspond to a predetermined percentage of the overall screen size. When projecting the image of the linearity transparency 40 on the screen 32, it is desirable that the projector 36 be aligned perpendicular to screen 32 and that the chart be projected precisely the size of display desired, underscanned or overscanned as appropriate, and properly centered.

A test pattern generator 42 is connected to the video input of monitor 30. Examples of a suitable test pattern generator 42 is the Signal Source 1206A or Signal Source 1211 Test Pattern Generator manufactured by Visual Information Institute, Inc., of Xenia, Ohio. The latter is preferred because it is a clocked pattern. When test pattern generator 40 is connected, the input signals should be set at levels specified and not varied throughout the test. The controls of monitor 30 should be in the positions that they will be in during the actual application so that the condition of monitor 30 during the test will be the same as that during actual application thereby providing a quantitative indication of linearity under actual use conditions.

Figure 3:
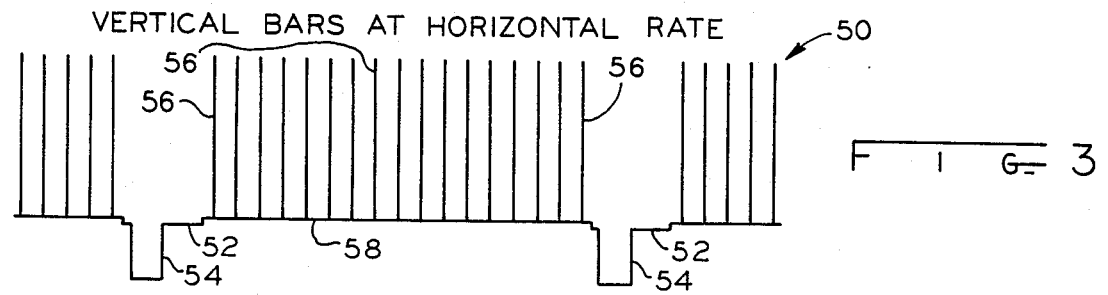
FIG. 3 is a horizontal rate video waveform for the generation of vertical bars.
Figure 9:
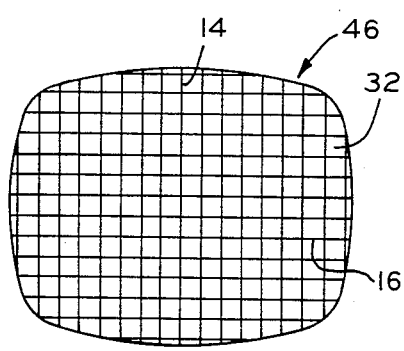
FIG. 9 is a view of the screen of a television monitor displaying a bar pattern.

In a conventional fashion, either a cross hatch bar pattern or dot pattern output signal from test pattern generator 42 is provided on output 44 connected to the video input of monitor 30. FIG. 9 illustrates cathode ray tube screen 32 having a bar pattern 46 thereon comprised of a series of vertical bars 14 and a series of horizontal bars 16 perpendicular to each other to form a grid or cross hatch pattern on screen 32. The same bar pattern is illustrated in FIG. 6 superimposed on an image of the linearity chart 12. Under current standards, the foundation for vertical bars is 20 elements per total horizontal line, including blanking. Since the horizontal blanking pulse is 17.5% of the total horizontal line, there are only 17 visible vertical bars centered in the active area, yielding a 1.25% margin at each edge of the display. In other words, the bars at the left and right are set in from the edge by 1.25% of the horizontal line time. The circuitry for producing vertical bars is present in a number of currently available signal source generators, such as those manufactured by Visual Information Institute, Inc. of Xenia, Ohio. The output waveform 50 for vertical bars 14 is illustrated in FIG. 3. Waveform 50, which is a plot of voltage versus time at the horizontal rate, comprises blanking pulses 52, synchronizing pulses 54, and a plurality of narrow pulses 56 producing a series of white level dots across screen 32 for each horizontal line. Line 58 represents the black level for the signal, so that the pattern produced will be a series of white level vertical bars on a substantially black background.

Figure 4:
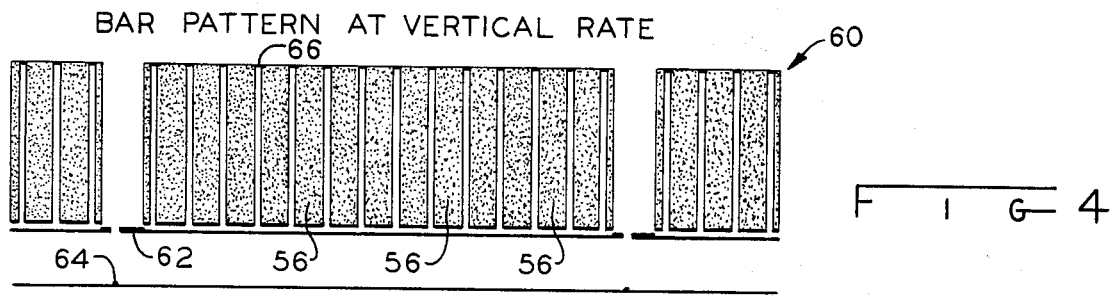
FIG. 4 is a vertical rate video waveform for the generation of the vertical and horizontal bars.

Fifteen horizontal bars 16 are produced for each frame, but one vertical bar 16 would not be visible due to vertical blanking, thereby leaving 14 visible horizontal lines on the display. FIG. 4 illustrates the waveform 60 for both the horizontal and vertical bars, and comprises vertical blanking pulses 62, vertical sync pulses 64, a series of pulses 66 to form the 14 horizontal bars 16, and a plurality of narrow pulses 56 (FIG. 3) shown collectively and without detail in FIG. 4.

Figure 5:
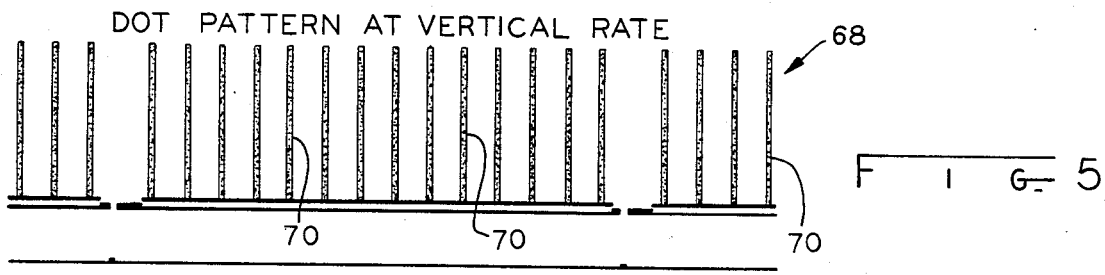
FIG. 5 is a vertical rate video waveform for the generation of a dot pattern.
Figure 10:
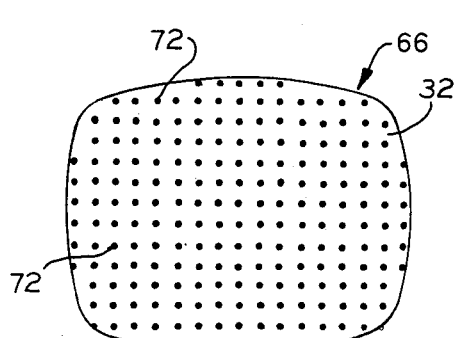
FIG. 10 is a view of the screen of a television monitor displaying a dot pattern.

Test pattern generator 44 can also be adjusted to produce a dot pattern 66, such as that shown in FIG. 10 on the face of screen 32. The dot pattern, as is well known, comprises a plurality of small pin points of white level developed at the same places where the vertical bars 14 and horizontal bars 16 would intersect, and may also be used with a linearity chart of the type shown in FIG. 6. FIG. 5 illustrates the waveform 68 for producing a dot pattern 66, and will be seen to comprise a series of very narrow pulses similar to pulses 56 in FIG. 3 at each of the locations 70 illustrated in FIG. 5. Unlike the vertical bar pattern illustrated in FIG. 3, however, the vertical pulses 56 would not be repeated on every horizontal line, but only at the horizontal line positions 70 shown in FIG. 5. Dots 72 in dot pattern 66 (FIG. 10) can be generated to be fairly small in size, thereby increasing the precision with which they can be located within graphic elements 18 superimposed on dot pattern 66.

As discussed earlier, it is necessary to match the scan rate of the electrical signal 44 produced by test generator 42 to the scan rate for the chart 12 imprinted on transparency 40 that is projected on screen 32. The following chart indicates the horizontal lines which are intensified, either as solid bars 14 and 16 by waveform 60 shown in FIG. 4 or as a plurality of dots 72 by the waveform 68 shown in FIG. 5.

ion skew barrel, non-linearity, tilt, "S" distortion, keystone and hooking. It may be desirable to use the dot pattern 66 in the final stages of this procedure for evaluating exact match of the chart 12 and pattern 66. If a color display is being evaluated, the bar and dot patterns may not be white, but may show separate red, green and blue components if the display is not properly converged. If this condition exists to the point that it interferes with measurement, the measurement size adjustments to monitor 30 should be made with green dots only.

The scan rate which is selected for the signal 44 provided to monitor 30 may be selected by adjusting the controls of a variable scan rate test pattern generator, such as the signal source 1206 discussed earlier, or a fixed scan rate test pattern generator can be selected. As an alternative to using a transparency 40 projected by

TABLE I

TV RASTER STRUCTURE TO MATCH LINEARITY CHARTS
H BARS-SCAN LINES TO BE INTENSIFIED

| SCAN RATE | | 525/60 | 675/60 | 729/60 | 875/60 | 945/60 | 1023/60 | 1029/60 | 1225/60 | U.S. 625/50 | CCIR 625/50 |
|---|---|---|---|---|---|---|---|---|---|---|---|
| V BLANKING (lines) | | 20 | 26 | 28 | 33 | 36 | 39 | 39 | 41 | 20 | 25 |
| TOP EDGE | | 0 | 0 | 0 | 0 | 0 | 0 | 0 | 0 | 0 | 0 |
| H BAR NUMBER | 1 | 11 | 13 | 12 | 14 | 17 | 15 | 17 | 17 | 10 | 8 |
| | 2 | 28 | 35 | 36 | 43 | 48 | 49 | 51 | 58 | 31 | 29 |
| | 3 | 45 | 57 | 60 | 72 | 79 | 83 | 85 | 99 | 52 | 50 |
| | 4 | 62 | 79 | 84 | 101 | 110 | 117 | 119 | 140 | 73 | 71 |
| | 5 | 79 | 101 | 108 | 130 | 141 | 151 | 153 | 181 | 94 | 92 |
| | 6 | 96 | 123 | 132 | 159 | 172 | 185 | 187 | 222 | 115 | 113 |
| | 7 | 113 | 145 | 156 | 188 | 203 | 219 | 221 | 263 | 136 | 134 |
| | 8 | 130 | 167 | 180 | 217 | 234 | 253 | 255 | 304 | 157 | 155 |
| | 9 | 147 | 189 | 204 | 246 | 265 | 287 | 289 | 345 | 178 | 176 |
| | 10 | 164 | 211 | 228 | 275 | 296 | 321 | 323 | 386 | 199 | 197 |
| | 11 | 181 | 233 | 252 | 304 | 327 | 355 | 357 | 427 | 220 | 218 |
| | 12 | 198 | 255 | 276 | 333 | 358 | 389 | 391 | 468 | 241 | 239 |
| | 13 | 215 | 277 | 300 | 362 | 389 | 423 | 425 | 509 | 262 | 260 |
| | 14 | 232 | 299 | 324 | 391 | 420 | 457 | 459 | 550 | 283 | 281 |
| BOTTOM EDGE | | 242.5 | 311.5 | 336.5 | 404.5 | 436.5 | 472.5 | 475.5 | 566.5 | 292.5 | 287.5 |
| H BAR SPACING | | 17 | 22 | 24 | 29 | 31 | 34 | 34 | 41 | 21 | 21 |

Figure 8:
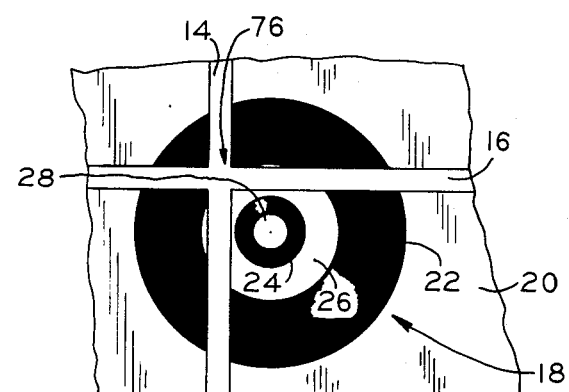
FIG. 8 is an enlarged view of one of the graphic elements of the linearity charts shown in FIG. 6 on which is superimposed a portion of the bar pattern.

An appropriate chart 12, preferably in the form of a slide transparency 40, is selected for the scan rate to be used and pattern generator 42 has its controls adjusted to produce a bar pattern 46 or dot pattern 66 on the screen 32 of monitor 30 at the same scan rate as that of the selected chart 12. In a perfect display situation, when chart 12 is projected on screen 32, an intersection of the electronic bar pattern 46 would be located precisely at the center 28 (FIG. 7) of each of the graphic elements 18 on the linearity chart image. The display device linearity and other compensating controls are adjusted as required to obtain the best possible match of the chart image with the bar display, thereby setting up the monitor 30 for best operation under the normal conditions, wherein the linearity and other compensating controls are left at the same settings. The degree of error of an intersection point 76 (FIG. 8) within graphic element 18 denotes the degree of error as a percentage of the overall height H (FIG. 6) of the display. For example, the intersection point 76 of vertical and horizontal lines 14 and 16 shown in FIG. 8 falls within the outermost annulus 22, which indicates an error of plus or minus 2%. If the intersection point would lie between annuli 22 and 24 and it would indicate an error of plus or minus 1%.

The overall relationship between bar pattern 46 and the pattern of graphic elements 18 on chart 12 should be noted to determine typical problems, including pincushprojector 36 on screen 32, the chart 12 can be directly projected thereon by using a transparent overlay affixed directly to screen 32. For purposes of the present application, the term "projected" means that the image of the chart 12 is superimposed over the bar or dot pattern on screen 32 either from a distance, as by projecting equipment 36, or at very close range by affixing a transparency (not shown) directly to screen 32. Other techniques of projecting the image may also be appropriate.

Figure 2:
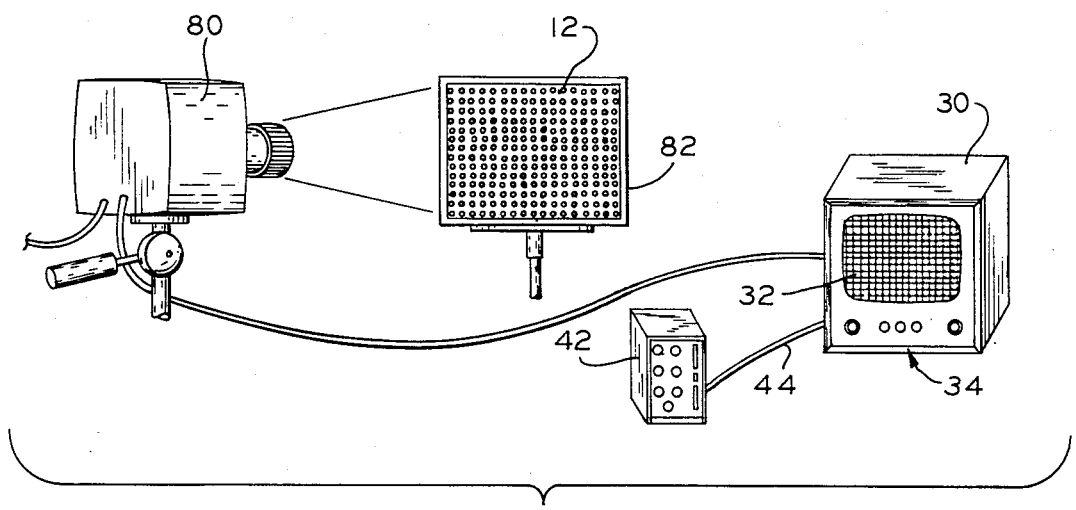
FIG. 2 is a diagrammatic representation of a test for the linearity of a television camera.

FIG. 2 illustrates the method for testing the linearity of a conventional television camera 80, which is mounted to view chart 12 supported in a chart holding mechanism 82. The image of chart 12 as viewed by camera 80 is connected to the video input of television monitor 30, and the test pattern signal from test pattern generator 34 on output 44 is superimposed on the signal from camera 80, again at the video input of monitor 30. Camera 80 is adjusted so that the image of chart 12 as viewed on screen 32 fills the entire viewing area of screen 32, and the controls (not shown) of camera 80 are adjusted to provide the best match between the graphic elements 18 of charts 12 and the bars 14, 16, or dots 72 on screen 32. These same criteria are used to determine the degree of non-linearity as with the method of FIG. 1.

While this invention has been described as having a preferred design, it will be understood that it is capable of further modification and is applicable to all scan rates of a raster scan device. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method of testing the raster scan geometry of a television display apparatus having a screen comprising:
   providing to the television display apparatus an electrical signal corresponding to a selected scan rate and generated by means of an electronic test pattern generator which produces on the raster scan of the television display apparatus a plurality of the reference images arranged in a plurality of orthogonal horizontal rows and vertical columns and adjusting the spacing of the horizontal rows by selecting a particular scan rate from the plurality of available scan rates for the electrical signal provided to the television display apparatus,
   providing a plurality of linearity test chart transparencies matched to a plurality of respective scan rates, each said transparency comprising a plurality of horizontal rows and vertical columns of substantially identical graphic elements on a background, each element comprising at least two concentric annuli surrounding a circular center space,
   selecting from the plurality of transparencies a transparency matching the scan rate of the signal provided to the television display apparatus and projecting an image of the transparency on the screen of the television display apparatus such that as many of the reference images as possible are located at the centers of the respective graphic elements, whereby the linearity of the scan geometry can be determined by noting the number of reference images which lie within the respective graphic elements and the positions of said reference images which lie within the graphic elements relative to the respective concentric annuli and center spaces.

2. The method of claim 1 wherein each of the graphic elements projected on the screen comprises three concentric annuli surrounding the center space wherein the outermost and innermost annuli are of a shade contrasting with the background and the center space and the annulus between the outermost and innermost annuli.

3. The method of claim 2 wherein the background of the projected image is white and the projected images of the outermost and innermost annuli are black.

4. The method of claim 1 wherein the reference images on the raster scan are dots.

5. The method of claim 1 wherein the reference images on the raster scan are the intersections of vertical and horizontal bars.

6. The method of claim 1 wherein the television display apparatus includes a raster comprising a plurality of horizontal scan lines including the steps of: providing a said electrical signal to the television display apparatus having a scan rate of 675/60 and producing a series of horizontal rows of said reference images wherein the first said row is the 11th horizontal line of the display raster and subsequent rows occur every 17 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

7. The method of claim 1 wherein the television display apparatus includes a raster comprising a plurality of horizontal scan lines including the steps of: providing a said electrical signal to the television display apparatus having a scan rate of 729/60 and producing a series of horizontal rows of said reference images wherein the first said row is the 12th horizontal line of the display raster and subsequent rows occur every 24 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

8. The method of claim 1 wherein the television display apparatus includes a raster comprising a plurality of horizontal scan lines including the steps of: providing a said electrical signal to the television display apparatus having a scan rate of 875/60 and producing a series of horizontal rows of said reference images wherein the first said row is the 14th horizontal line of the display raster and subsequent rows occur every 29 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

9. The method of claim 1 wherein the television display apparatus includes a raster comprising a plurality of horizontal scan lines including the steps of: providing a said electrical signal to the television display apparatus having a scan rate of 945/60 and producing a series of horizontal rows of said reference images wherein the first said row is the 17th horizontal line of the display raster and subsequent rows occur every 31 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

10. The method of claim 1 wherein the television display apparatus includes a raster comprising a plurality of horizontal scan lines including the steps of: providing a said electrical signal to the television display apparatus having a scan rate of 1023/60 and producing a series of horizontal rows of said reference images wherein the first said row is the 15th horizontal line of the display raster and subsequent rows occur every 34 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

11. The method of claim 1 wherein the television display apparatus includes a raster comprising a plurality of horizontal scan lines including the steps of: providing a said electrical signal to the television display apparatus having a scan rate of 1029/60 and producing a series of horizontal rows of said reference images wherein the first said row is the 17th horizontal line of the display raster and subsequent rows occur every 34 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

12. The method of claim 1 wherein the television display apparatus includes a raster comprising a plurality of horizontal scan lines including the steps of: providing a said electrical signal to the television display apparatus having a scan rate of 1225/60 and producing a series of horizontal rows of said reference images wherein the first said row is the 17th horizontal line of the display raster and subsequent rows occur every 41 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

13. The method of claim 1 wherein the television display apparatus includes a raster comprising a plurality of horizontal scan lines including the steps of: providing a said electrical signal to the television display apparatus having a scan rate of 625/50 and producing a series of horizontal rows of said reference images wherein the first said row is the 8th horizontal line of the display raster and subsequent rows occur every 21 lines thereafter, and selecting from a plurality of transparencies a transparency wherein the geometrical centers of the concentric annuli of the rows of graphic elements coincide approximately with the respective rows of reference images when the image of the selected transparency is projected onto the screen.

14. A method of testing the raster scan geometry of the signal produced by a television camera comprising:
connecting a television monitor to the camera for displaying on the screen of the monitor the scene viewed by the camera;
providing to the monitor an electrical signal corresponding to a selected scan rate and generated by means of an electronic test pattern generator which produces on the raster scan of the television monitor a plurality of reference images arranged in a plurality of orthogonal horizontal rows and vertical columns and adjusting the spacing of the horizontal rows by selecting a particular scan rate from a plurality of available scan rates for the electrical signal provided to the television monitor;
providing a plurality of linearity test charts matched to a plurality of respective scan rates, each said chart comprising a plurality of horizontal rows and vertical columns of substantially identical graphic elements on a background, each element comprising at least two concentric annuli surrounding a circular center space;
selecting from the plurality of charts a chart matching the scan rate of the signal provided to the monitor and viewing the selected chart with the camera to cause the chart to appear on the screen of the monitor such that as many of the reference images as possible are located at the centers of the respective graphic elements on the screen, whereby the linearity of the scan geometry can be determined by noting the number of reference images which lie within the respective graphic elements and the positions of said reference images which lie within the graphic elements relative to the respective concentric annuli and center spaces.

15. The method of claim 14 wherein each of the graphic elements that appear on the screen comprises three concentric annuli surrounding the center space wherein the outermost and innermost annuli are of a shade contrasting with the background and the center space and the annulus between the outermost and innermost annuli.

16. The method of claim 14 wherein the reference images on the raster scan are dots.

17. The method of claim 14 wherein the reference images on the raster scan are the intersections of vertical and horizontal bars.

18. The method of claim 14 wherein the camera and monitor include a raster comprising a plurality of horizontal scan lines and including the step of providing a said electrical signal to the monitor having a scan rate of 675/60 and producing a series of horizontal rows of said reference images wherein the first said row is the 11th horizontal line of the raster and subsequent rows occur every 17th line thereafter, and selecting from the plurality of charts a chart wherein the geometric centers of the concentric annuli of the rows of graphic elements coincide approximately with the respective rows of reference images when the selected chart appears on the monitor screen.

19. The method of claim 14 wherein the camera and monitor include a raster comprising a plurality of horizontal scan lines and including the step of providing a said electrical signal to the monitor having a scan rate of 729/60 and producing a series of horizontal rows of said reference images wherein the first said row is the 12th horizontal line of the raster and subsequent rows occur every 24th line thereafter, and selecting from the plurality of charts a chart wherein the geometric centers of the concentric annuli of the rows of graphic elements coincide approximately with the respective rows of reference images when the selected chart appears on the monitor screen.

20. The method of claim 14 wherein the camera and monitor include a raster comprising a plurality of horizontal scan lines and including the step of providing a said electrical signal to the monitor having a scan rate of 875/60 and producing a series of horizontal rows of said reference images wherein the first said row is the 14th horizontal line of the raster and subsequent rows occur every 29th line thereafter, and selecting from the plurality of charts a chart wherein the geometric centers of the concentric annuli of the rows of graphic elements coincide approximately with the respective rows of reference images when the selected chart appears on the monitor screen.

21. The method of claim 14 wherein the camera and monitor include a raster comprising a plurality of horizontal scan lines and including the step of providing a said electrical signal to the monitor having a scan rate of 945/60 and producing a series of horizontal rows of said reference images wherein the first said row is the 17th horizontal line of the raster and subsequent rows occur every 31st line thereafter, and selecting from the plurality of charts a chart wherein the geometric centers of the concentric annuli of the rows of graphic elements coincide approximately with the respective rows of reference images when the selected chart appears on the monitor screen.

22. The method of claim 14 wherein the camera and monitor include a raster comprising a plurality of horizontal scan lines and including the step of providing a said electrical signal to the monitor having a scan rate of 1023/60 and producing a series of horizontal rows of said reference images wherein the first said row is the 15th horizontal line of the raster and subsequent rows occur every 34th line thereafter, and selecting from the plurality of charts a chart wherein the geometric centers of the concentric annuli of the rows of graphic elements coincide approximately with the respective rows of reference images when the selected chart appears on the monitor screen.

23. The method of claim 14 wherein the camera and monitor include a raster comprising a plurality of horizontal scan lines and including the step of providing a said electrical signal to the monitor having a scan rate of 1029/60 and producing a series of horizontal rows of said reference images wherein the first said row is the 17th horizontal line of the raster and subsequent rows occur every 34th line thereafter, and selecting from the plurality of charts a chart wherein the geometric centers of the concentric annuli of the rows of graphic elements coincide approximately with the respective rows of reference images when the selected chart appears on the monitor screen.

24. The method of claim 14 wherein the camera and monitor include a raster comprising a plurality of horizontal scan lines and including the step of providing a said electrical signal to the monitor having a scan rate of 1225/60 and producing a series of horizontal rows of said reference images wherein the first said row is the 17th horizontal line of the raster and subsequent rows occur every 41st line thereafter, and selecting from the plurality of charts a chart wherein the geometric centers of the concentric annuli of the rows of graphic elements coincide approximately with the respective rows of reference images when the selected chart appears on the monitor screen.

25. The method of claim 14 wherein the camera and monitor include a raster comprising a plurality of horizontal scan lines and including the step of providing a said electrical signal to the monitor having a scan rate of 625/50 and producing a series of horizontal rows of said reference images wherein the first said row is the 8th horizontal line of the raster and subsequent rows occur every 21st line thereafter, and selecting from the plurality of charts a chart wherein the geometric centers of the concentric annuli of the rows of graphic elements coincide approximately with the respective rows of reference images when the selected chart appears on the monitor screen.

* * * * *